United States Patent

[11] 3,581,127

| | | |
|---|---|---|
| [72] | Inventor | Kenneth Warnett |
| | | Wyke, Bradford, England |
| [21] | Appl. No. | 817,670 |
| [22] | Filed | Apr. 21, 1969 |
| [45] | Patented | May 25, 1971 |
| [73] | Assignee | Electro-Lifts Limited |
| | | Leeds, England |
| [32] | Priority | Apr. 20, 1968 |
| [33] | | Great Britain |
| [31] | | 18777/68 |

[54] LINEAR ELECTRIC MOTOR
3 Claims, 3 Drawing Figs.

[52] U.S. Cl. .................................................. 310/13
[51] Int. Cl. .................................................. H02k 41/02
[50] Field of Search ........................................ 310/12-
—14; 318/119—135

[56] References Cited
UNITED STATES PATENTS

| | | | |
|---|---|---|---|
| 3,241,006 | 3/1966 | Boyko .......................... | 310/14X |
| 2,640,955 | 6/1953 | Fisher ........................... | 310/13X |
| 2,462,533 | 2/1949 | Moynihan .................... | 310/12 |

FOREIGN PATENTS

| | | | |
|---|---|---|---|
| 805,223 | 12/1958 | Great Britain ............... | 310/13 |

OTHER REFERENCES

" IBM TECHNICAL DISCLOSURE BULLETIN ",
Smeltzer, Vol. 4, #3, August 1961

*Primary Examiner*—D. F. Duggan
*Attorney*—Norris & Bateman

ABSTRACT: A linear motor has an armature with an electrical winding and a stator with a plurality of axially spaced pole pieces. These pole pieces are of annular formation surrounding the armature, and are joined together by a cylindrical outer casing which provides the flux path. There are field windings fitted between adjacent pole pieces, and pairs of brushes mounted on the faces of the intermediate pole pieces and urged into contact with the armature winding.

PATENTED MAY 25 1971
3,581,127
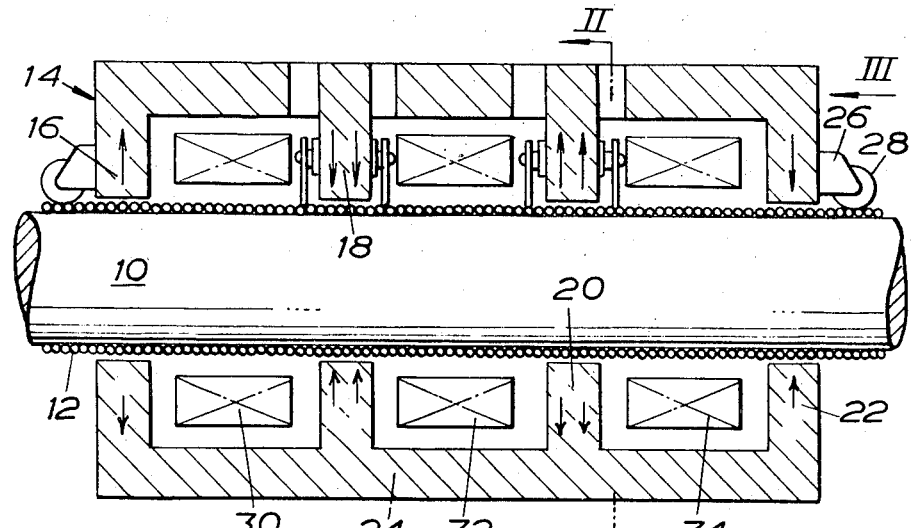
-FIG. 1.-
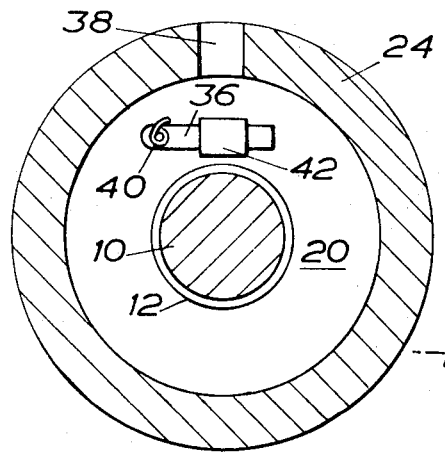
-FIG. 2.-
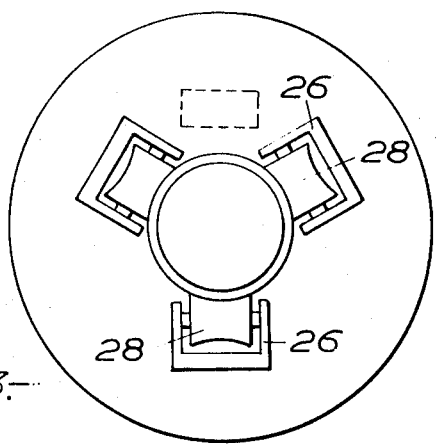
-FIG. 3.-
INVENTOR:
KENNETH WARNETT
BY
Norris & Bateman

LINEAR ELECTRIC MOTOR

The invention relates to linear electric motors and has for its object to provide an improvement therein. In particular, the invention relates to linear electric motors of the direct current type including an armature in the form of a bar of ferromagnetic material having an electrically conductive winding insulated therefrom; a field coil assembly having at least two axially spaced pole pieces and at least one electrically conductive winding for energizing said pole pieces; and pairs of spaced brushes for contacting the winding of the armature so as to energize portions of said winding in the regions of said pole pieces.

According to the invention, a linear electric motor comprises a ferromagnetic bar-type armature, an electrically conductive winding around said armature but insulated therefrom; a field coil assembly having axially spaced pole pieces, said pole pieces including at least two end pole pieces and one intermediate pole piece, each of said pole pieces substantially surrounding said armature; a continuous ferromagnetic outer casing connecting all of said pole pieces; at least one electrically conductive winding for energizing said pole piece, said winding being disposed so that said intermediate pole piece is connected in two adjacent magnetic circuits, and brushes mounted on the flanks of said intermediate pole piece and up to one of said end pole pieces, at least one of said end pole pieces being without said brushes, said brushes contacting said winding around said armature. Respective pairs of brushes preferably flank said pole pieces and can preferably be replaced, when worn, through apertures in the motor casing. Brush holders, in which said brushes are slidably mounted, are preferably attached to or formed integrally on the flanks of the pole pieces. Clusters of rollers are preferably provided at the opposite ends of the motor for guiding the armature, said rollers conveniently being mounted in respective brackets projecting from ends ones of the pole pieces which constitute closure members for the ends of the outer casing.

In order that the invention may be fully understood and readily carried into effect, a preferred embodiment thereof will now be described by way of example only, with reference to the accompanying drawings, in which:

FIG. 1 is a longitudinal section through a linear electric motor,

FIG. 2 is a section on the line II—II in FIG. 1, and

FIG. 3 is an end view looking in the direction of arrow III in FIG. 1.

In this preferred embodiment, there is provided a linear electric motor including an armature 10 constituted by a straight bar of ferromagnetic material having an electrically conductive winding 12 wrapped around it, but insulated therefrom. A stator 14 through which the armature extends includes four axially spaced pole pieces 16, 18, 20 and 22 of annular form connected together by means of a cylindrical outer casing 24 of ferromagnetic material. The two end pole pieces 14 and 22 constitute closure members for the ends of the cylindrical outer casing 24.

At each end of the stator there are three brackets 26 (see FIGS. 1 and 3) equiangularly spaced around the armature 10 where the latter projects from the stator, and a roller 28 is free to rotate in each bracket. Each roller 28 is shaped so that it conforms to the curvature of the winding on the armature and, in this way, the cluster of three rollers at each end of the stator provides a guide for the armature through the bores of the pole pieces. The rollers are made of electrically insulating material.

Three field windings 30, 32 and 34 are disposed in the annular spaces between adjacent pole pieces, and the arrangement is such that when direct current is flowing through said windings there are produced three magnetic circuits each of which extends radially of adjacent pole pieces and along sections of the armature and sections of the outer casing. It will, of course, be understood that each intermediate pole piece 18 or 20 is connected in two adjacent magnetic circuits and the current flow in the field windings is thus arranged so that the magnetic flux in adjacent circuits flows in different directions so as to combine together in said pole pieces. The direction of the magnetic flux path is shown by arrows in FIG. 1.

Respective pairs of carbon brushes 42 flank the intermediate pole pieces 18 and 20 for contacting the armature winding 12 so as to energize portions of said winding in the regions of said pole pieces (insulation having been removed from the outer surface of the winding to allow such contact). Brush holders 36, in which said brushes are slidably mounted, are pivoted to the flanks of the pole pieces 18 and 20, and apertures 38 in the peripheral wall of the cylindrical outer casing 24 are aligned with said holders so that the brushes, when worn, can be removed through said apertures for replacement by new brushes. A torsion spring 40 engaging with each brush holder urges the brush on to the winding 12.

The arrangement is such that, when the field windings and the armature winding are energized there is produced an axial thrust upon the armature 10 which is proportional to the product of the magnetic flux in the magnetic circuits of the stator 14 and to the current density in the armature winding 12. By virtue of the particular form of the stator first described, the magnetic flux in the pole pieces and in the cylindrical outer casing is evenly distributed around the armature. The annular formation of the pole pieces 16, 18 20 and 22 results in a convenient method of locating the brushes as hereinbefore described.

Various modifications may be made without departing from the scope of the invention. For example, it will be understood that the stator may be provided with any number of pole pieces from two upwards with a corresponding number of field windings from one upwards. It will also be understood that the armature need not necessarily be mounted in rollers such as the rollers 28; it could if preferred, be mounted in plain bearings.

A linear motor such as that described above may have numerous applications where a simple to-and-fro motion is required, for example in the operation of lift doors. Depending upon the particular application, the stator or the armature may be secured to a stationary part whilst the other is secured to the part which it is required to move.

I claim:

1. A linear electric motor comprising a ferromagnetic bar-type armature, an electrically conductive winding around said armature but insulated therefrom; a field coil assembly having axially spaced pole pieces, said pole pieces including at least two end pole pieces and an intermediate pole piece, each of said pole pieces substantially surrounding said armature; a continuous ferromagnetic outer casing connecting all of said pole pieces together; electrically conductive windings for energizing said pole pieces, said windings being disposed within said outer casing between adjacent pole pieces so that said intermediate pole piece is connected in two adjacent magnetic circuits; brushes mounted on said intermediate pole piece and contacting said winding on said armature, said outer casing having openings aligned with each of said brushes to allow said brushes to be replaced through said outer casing; and at least one of said end pole pieces being without any such brushes.

2. A linear electric motor in accordance with claim 1, wherein a cluster of rollers at each end of said outer casing embrace and guide said armature.

3. A linear electric motor according to claim 1, wherein there are at least two intermediate pole pieces, and both of said end pole pieces are without brushes.